United States Patent
Kuwata et al.

(10) Patent No.: US 7,246,119 B2
(45) Date of Patent: Jul. 17, 2007

(54) METHOD AND IMPLEMENTATION OF SESSION-BASED FILE LOCKING FOR NETWORK APPLICATIONS

(75) Inventors: Katie Kuwata, Oceanside, CA (US); William Su, Corona, CA (US); Truc Nguyen, San Diego, CA (US)

(73) Assignees: Kabushiki Kaisha Toshiba (JP); Toshiba Tec Kabushiki Kaisha (JP)

( * ) Notice: Subject to any disclaimer, the term of this patent is extended or adjusted under 35 U.S.C. 154(b) by 528 days.

(21) Appl. No.: 10/384,006

(22) Filed: Mar. 7, 2003

(65) Prior Publication Data

US 2003/0182285 A1   Sep. 25, 2003

Related U.S. Application Data

(60) Provisional application No. 60/362,825, filed on Mar. 8, 2002.

(51) Int. Cl.
*G06F 7/00* (2006.01)
(52) U.S. Cl. .......................... 707/8; 707/201
(58) Field of Classification Search .................. 707/2, 707/8–10, 202, 201, 205; 709/219
See application file for complete search history.

(56) References Cited

U.S. PATENT DOCUMENTS

| | | | |
|---|---|---|---|
| 5,490,270 A | 2/1996 | Devarakonda et al. | |
| 5,596,754 A | 1/1997 | Lomet | |
| 5,628,005 A | 5/1997 | Hurvig | |
| 5,692,178 A | 11/1997 | Shaughnessy | |
| 5,890,153 A | 3/1999 | Fukuda et al. | |
| 5,933,825 A | 8/1999 | McClaughry et al. | |
| 5,956,712 A | 9/1999 | Bennett et al. | |
| 5,978,802 A | 11/1999 | Hurvig | |
| 5,999,976 A | 12/1999 | Schmuck et al. | |
| 6,009,426 A | 12/1999 | Jouenne et al. | |
| 6,009,427 A | 12/1999 | Wolff | |
| 6,035,297 A | 3/2000 | Van Huben et al. | |
| 6,078,982 A | 6/2000 | Du et al. | |
| 6,192,408 B1 | 2/2001 | Vahalia et al. | |
| 6,240,414 B1 | 5/2001 | Beizer et al. | |
| 6,324,565 B1 | 11/2001 | Holt, III | |
| 6,330,560 B1 | 12/2001 | Harrison et al. | |

(Continued)

*Primary Examiner*—Sathyanarayan Pannala
(74) *Attorney, Agent, or Firm*—Tucker Ellis & West LLP

(57) ABSTRACT

A file locking method and implementation are disclosed which allows a plurality of user sessions to open and read a file, but at any one time, only one session will be allowed to change the data displayed in the browser window and to update the file. This file locking method sets up a file access priority by using file locks that are date-time stamped and session stamped. The types of lock associated with the present invention include read lock, authority lock, write lock, and folder lock. When a session/user requests access to a file, the application will check a lock table associated with the requested file. For each lock on the file, there is an entry in the lock table for each of the attributes of the lock: lock type, session owner, date-time stamp. Depending on the lock and the existing locks on the file, the requesting session may be granted a lock. After the access request is fulfilled, the file lock may be removed. When a session expires, all the locks owned by this session will be invalidated and removed.

26 Claims, 5 Drawing Sheets

U.S. PATENT DOCUMENTS

| | | |
|---|---|---|
| 6,353,828 B1 | 3/2002 | Ganesh et al. |
| 6,480,894 B1 * | 11/2002 | Courts et al. .............. 709/227 |
| 6,598,077 B2 * | 7/2003 | Primak et al. ............. 709/219 |
| 6,633,870 B1 * | 10/2003 | Bradley ........................ 707/8 |
| 2002/0049748 A1 * | 4/2002 | Iki et al. ........................ 707/2 |
| 2002/0174421 A1 * | 11/2002 | Zhao et al. ................. 717/174 |
| 2003/0158928 A1 * | 8/2003 | Knox et al. ................. 709/223 |
| 2003/0236786 A1 * | 12/2003 | Shi et al. ...................... 707/8 |

* cited by examiner

METHOD AND IMPLEMENTATION OF SESSION-BASED FILE LOCKING FOR NETWORK APPLICATIONS

CROSS REFERENCES TO RELATED APPLICATIONS

This application claims the benefit of priority from U.S. Provisional Application 60/362,825 filed Mar. 8, 2002.

BACKGROUND OF THE INVENTION

The present invention relates to the field of document management in session-based applications on a shared network, preferably on an embedded web server system. A "session" is a period that starts when the user initiates a connection with the web-based application from his browser. The session ends when the user closes the connection or when a period of inactivity has elapsed. In some applications, multiple users having multiple sessions may access and update document files stored on a web server. If every session/user can update a common file at will, there will be unpredictable results. For example, a user in a particular session may cut a page of the document while a user in another session may want to move that page to another location. If all the users are able to make to change the document in a different manner, this can result in irrevocable damage to the files, including overlapping edits, lost data or even the deletion of the file. In this manner, much confusion and inefficiency can result in the management of files and documents in a network.

SUMMARY OF THE INVENTION

The difficulties and drawbacks associated with previous-type methods and implementations are overcome by the present invention in which a file locking method and implementation are established which allows a plurality of user sessions to open and read a file, but at any one time, only one session will be allowed to change the data displayed in the browser window and to update the file.

In one embodiment, there is disclosed a system for managing document access, comprising file storage means, communication, means, and control means. The file storage means is adapted for storing and manipulating files and file folders. The communication means is adapted to communicate with an external computer. The control means is adapted to control access to the file storage means by the communication means, wherein the control means creates a lock for controlling access to either a file or a folder stored on the file storage means. The lock has attributes, including a date-time stamp.

It is further contemplated that the lock may be implemented as a temporary file having a file name with the attributes of the lock encoded in the file name. The date-time stamp is encoded in the file name in milliseconds. The lock attributes may also include a lock name, a session identification, and a type of lock. It is contemplated that the control means creates the lock at the beginning of a session received by the communications means and removes the lock when the session is closed. The session is closed by either the communications means receiving a communication indicating when the session is closed, or after a period of inactivity has elapsed.

It is contemplated that the system of the present invention can be used by an embedded web server system and the session is conducted by a session-based application.

Another embodiment of the present invention is directed to a method to manage access that comprises several steps. One step of the comprises receiving a request to initiate a lock on a resource, the resource is either a file or a folder. The request is received by a session having a session identification. Another step of the method is creating a temporary file having a file name with a lock attribute encoded therein. Yet another step of the method is granting the lock request when the resource is available. Finally, the method comprises updating the file name by pre-appending the session identification and a date-time stamp indicative of the date and time when the lock was placed.

The method also contemplates that the lock attribute may be either a read lock, an authority lock, a write lock, or a folder lock. The method also contemplates that the date-time stamp is encoded in milliseconds. Another attribute that the lock may have is a name. In a preferred embodiment, the resource is located on a web server executing a session based application.

The method may comprise additional steps where are dependent on the type of session requested. If the session request is to open a document, then once the lock implemented the document is sent to the session. If the session request is to save a document, additional steps include saving the document on the web server, removing the write lock, and updating the session status. If the session request is to modify a file, an additional step of updating the session status is contemplated. Finally, if the session request is to modify a folder, the additional steps include modifying the folder, removing the folder lock, and updating the session status. Finally, the lock is removed at the termination of the session. The session is terminated by either receiving a communication closing the session, or after a period of inactivity.

In anther embodiment, the present invention is implemented on a computer-readable medium of instructions. The instructions comprising means for receiving a request to initiate a lock on a resource by a session with a session identification, the resource is either a file or a folder; means for creating a temporary file having a file name with a lock attribute encoded therein; means for granting the lock request when the resource is available; and means for updating the file name by pre-appending the session identification and a date-time stamp indicative of the date and time when the lock was placed. The date-time stamp is encoded in milliseconds. The lock attributes may also include an attribute that is selected from the group consisting of read lock, authority lock, write lock, and folder lock, and the name of the lock.

In yet another embodiment, the present invention is implemented on a computer readable medium having stored thereon instructions which when executed by a processor, cause the processor to perform the steps of receiving a request to initiate a lock, creating a temporary file, granting the request, and updating the temporary file name by pre-appending the session identification and a date-time stamp indicative of the date and time when the lock was placed.

DETAILED DESCRIPTION OF THE INVENTION

The invention described herein solves the above problem by providing a file locking method and implementation that imposes a priority system to file access and update. This method allows multiple accesses, multiple reads, and multiple updates to all sessions/users in an orderly fashion so that the result is predictable and the integrity of the file update is preserved. In one exemplary embodiment of the invention, two or more sessions are trying to access a file at the same time. All of these sessions are allowed to open and read the file, but at any one time, only one session will be allowed to change the data displayed in the browser window and to update the file. Additionally, if one session starts to delete a file or folder and has received a permission to delete, all other sessions should not be able to read the folder or a file in this folder. This file locking method sets up a file access priority by using file locks that are date-time stamped and session stamped.

Figure 1:
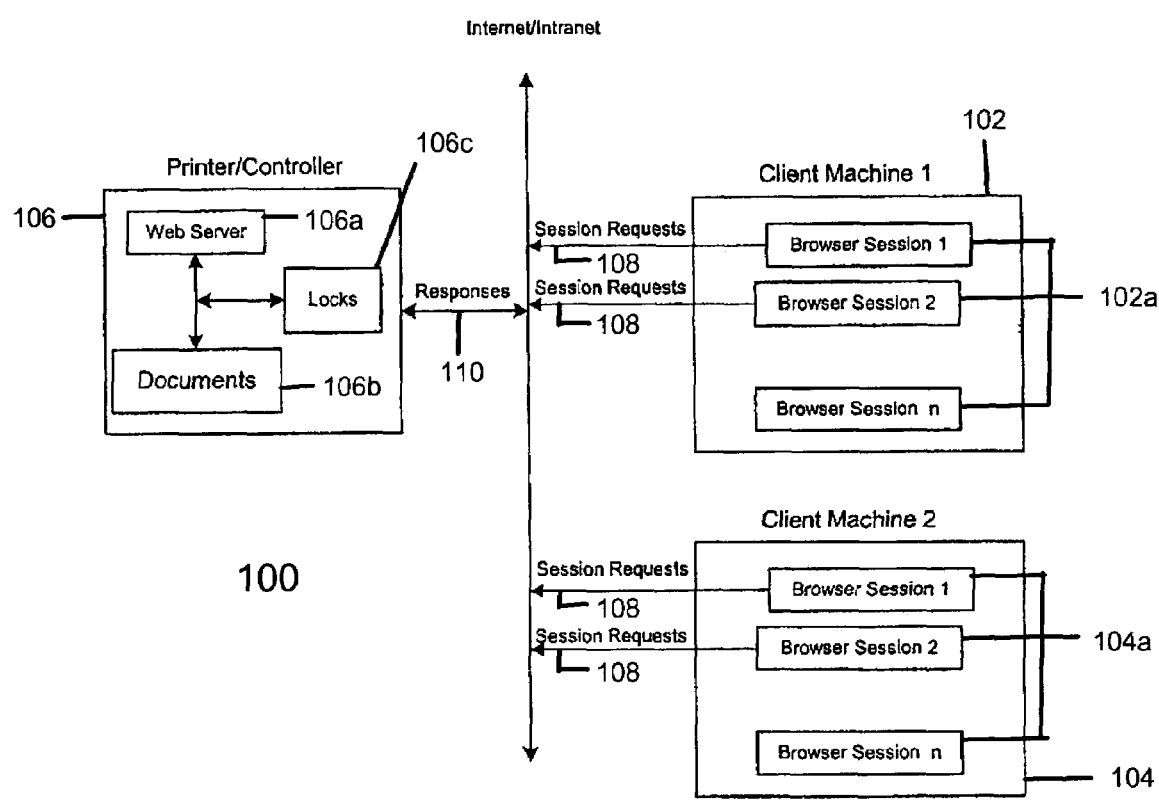
FIG. 1 is a block diagram depicting an exemplary network configured to deploy the method and implementation of the present invention.

An exemplary network 100 is shown in FIG. 1 for deploying the method and implementation of the present invention. Client Machines 1 (102) and 2 (104) send session requests 108 which are received and responded 110 to by a Printer/Controller 106 on the network 100. The Printer/Controller 106 governs access between the clients 102, 104 and a web server 106a that serves files or documents 106b requested by the clients. Each client 102, 104 may have multiple sessions 102a, 104a. Locks 106c are in place to govern client access to the documents. There are four types of locks 106c associated with the present invention: read lock, authority lock, write lock, and folder lock. Each lock 106c contains the date and time of the lock request, the name of the item to lock, and the session that requests the lock. When a session/user requests access to a file, the application will check a lock table associated with the requested file. For each lock on the file, there is an entry in the lock table for each of the attributes of the lock: lock type, session owner, date-time stamp. Depending on the lock and the existing locks on the file, the requesting session may be granted a lock. After the access request is fulfilled, the file lock may be removed. For example, after a write request is fulfilled (and the file has been updated with the changes from the session browser) the write lock is removed. When a session expires, all the locks owned by this session will be invalidated and removed.

The types of file locks and their operative properties are as follows:

Read-lock—When a session wants to read a file, a read-lock is requested. A session can acquire a read-lock if no other session owns write-lock on this file.

Authority-lock—When a session wants to change the data in the browser window, an authority-lock is requested. A session can acquire an authority-lock if no other session owns either a write-lock or an authority-lock on this file.

Write-lock—When a session wants to write (save/update/delete/rename) a file, a write-lock is requested. A session can acquire a write-lock if no other session owns a read-lock, an authority-lock, or a write-lock on this file.

Folder-lock—When a session wants to delete/rename a folder, a folder-lock is requested. A session can acquire a folder-lock if no other session owns any lock for any item in the folder.

The file locking method of the present invention works by enabling a file lock depending on the priority of the types of lock and the priority of the lock request. Various realizations of the invention as described hereinbelow describe the operation of the lock system with respect to three common types of requests: read, write and modify. These operations can be applied to both documents and folders.

The locks are preferably implemented as temporary files with the attributes of the locks encoded in the file name to facilitate searching and comparing lock types. Each lock file name contains the name of the lock item, combined with the requested date-time in milliseconds, the session ID and the type of lock. The types of lock are encoded as .r.lck for read-lock, .w.lck for write-lock, .a.lck for authority-lock and .lck for folder lock.

Figure 2:
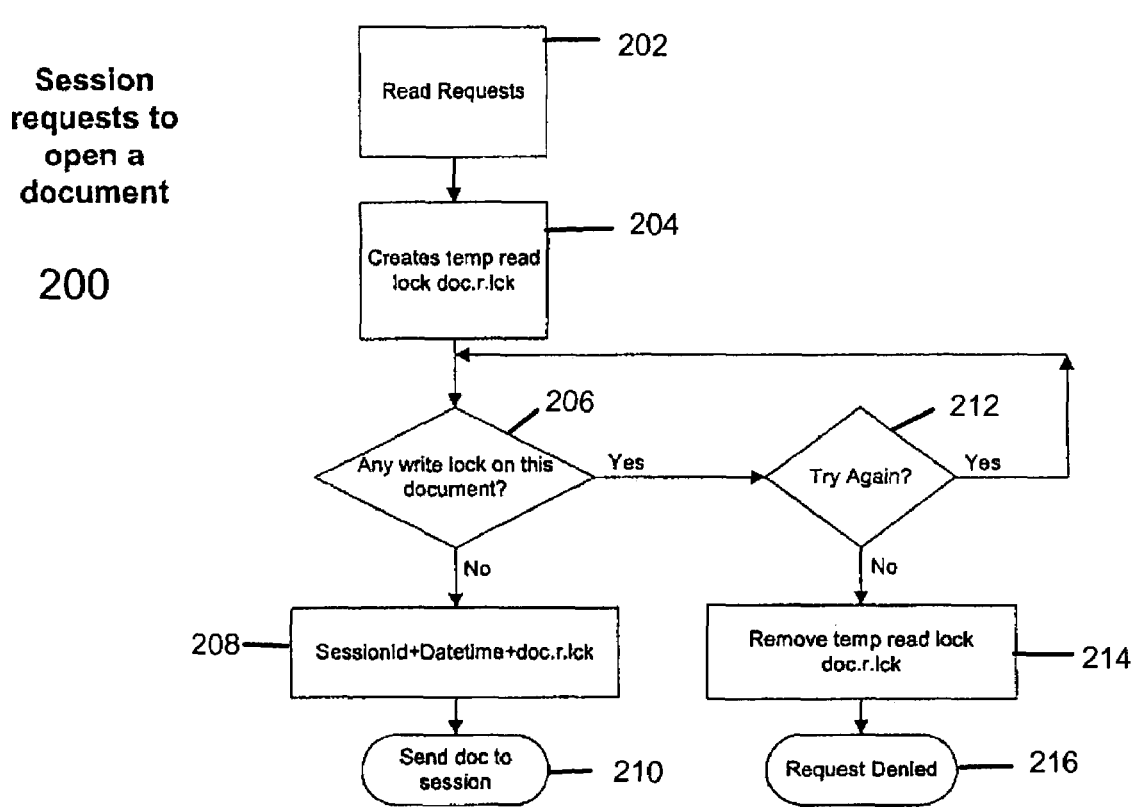
FIG. 2 is a flow chart depicting the steps associated with processing a session request to open a document in accordance with the present invention.

Referring now to FIG. 2, there is shown a method 200 contemplated by the present invention when a session requests to open a document. The method 200 begins at step 202 when a session 102a or 104a sends a read request to read a document 106b, which is received by the printer/controller 106. The web server 106a receives the request at step 204 and creates a temporary lock 106c file. The temporary lock file as shown in step 204 ending with doc.r.lck, where the 'doc' is the name of the document and the r.lck indicating a read lock. At step 206 the web server 106a determines whether there are any write locks on the document or a folder lock on the folder. If there are no locks on the document or on the folder, then at step 208 the temporary file name is renamed, the session identification and the date and time of the lock are pre-appended to the file name. Then at step 210, the document 106b is sent to the requesting session 102a or 102b.

If at step 206 it is determined there is another lock on the document, the system then determines whether the lock should be retried as shown in step 212. The retry may be done automatically or the user may be prompted. If retrying, the process returns to step 206, otherwise as shown at step 214 the temporary lock 106c file that was created in step 204 is deleted, and the lock request is denied as shown in step 216.

Figure 3:
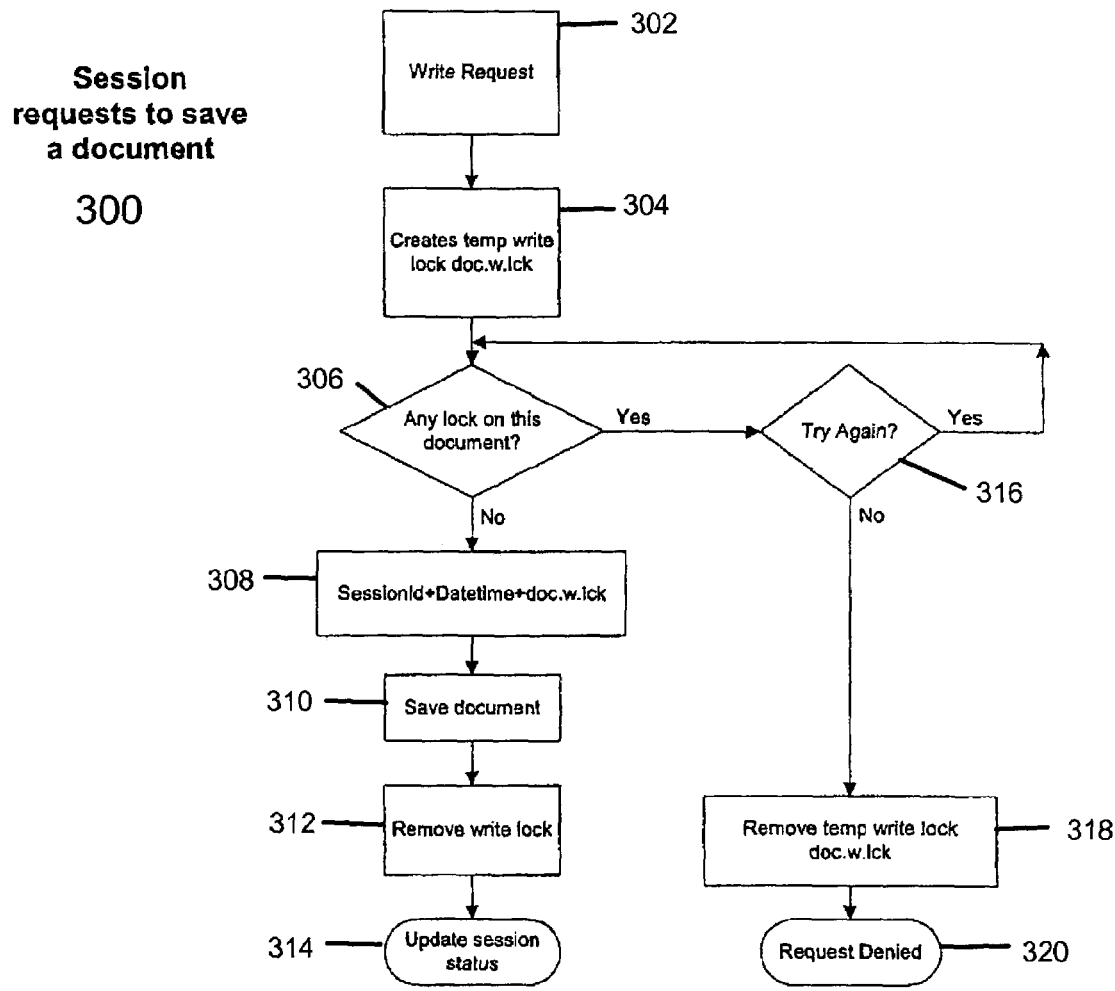
FIG. 3 is a flow chart depicting the steps associated with processing a session request to save a document in accordance with the present invention.

Referring now to FIG. 3, there is shown a method 300 used when a session requests to save a document. The write request is generated at step 302. A temporary lock file 304 is then created. The lock file has the name of the document, and end with w.lck indicating a write lock on the document. At step 306 it is determined if there is any other lock on the document, or folder. If there is no other lock, then the process proceeds to step 308. At step 308 the temporary file name is updated by pre-appending the session identification and date and time of lock to the file name. The document is then saved at step 310. After the document is saved, at step 312 the lock 106c is removed. Finally, at step 314 the session status is updated.

If at step 306 it is determined there is another lock on the document or folder, the system then determines whether the lock should be retried as shown in step 316. The retry may be done automatically or the user may be prompted. If retrying, the process returns to step 306, otherwise as shown at step 318 the temporary lock 106c file that was created in step 304 is deleted, and the lock request is denied as shown in step 320.

Figure 4:
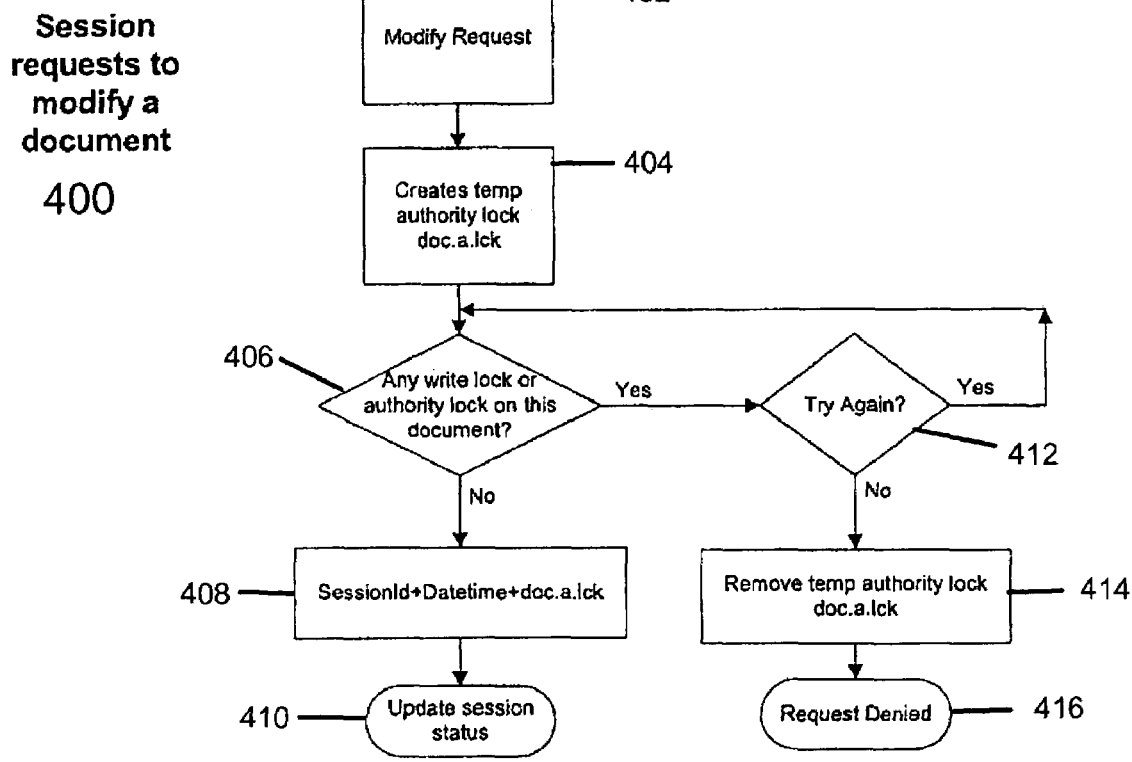
FIG. 4 is a flow chart depicting the steps associated with processing a session request to modify a document in accordance with the present invention.

Referring now to FIG. 4, there is shown a method 400 contemplated by the present invention when a session requests to open a document. The method 400 begins at step 402 when a session 102a or 102b sends a read request to read a document 106b, which is received by the printer/controller 106. The web server 106a receives the request at step 404 and creates a temporary lock 106c file. The temporary lock file as shown in step 404 ending with doc.a.lck, where the 'doc' is the name of the document and the r.lck indicating a read lock. At step 406 the web server 106a determines whether there are any write or authority locks on the document or a folder lock on the folder. If there are no locks on the document or folder, then at step 408 the temporary file name is renamed, the session identification and the date and time of the lock are pre-appended to the file name. Then at step 410, the session status of the requesting session 102a or 102b is updated.

If at step 406 it is determined there is another write or authority lock on the document, or a lock on the folder, then the system then determines whether the lock should be retried as shown in step 412. The retry may be done automatically or the user may be prompted. If retrying, the process returns to step 406, otherwise as shown at step 414 the temporary lock 106c file that was created in step 404 is deleted, and the lock request is denied as shown in step 416.

Figure 5:
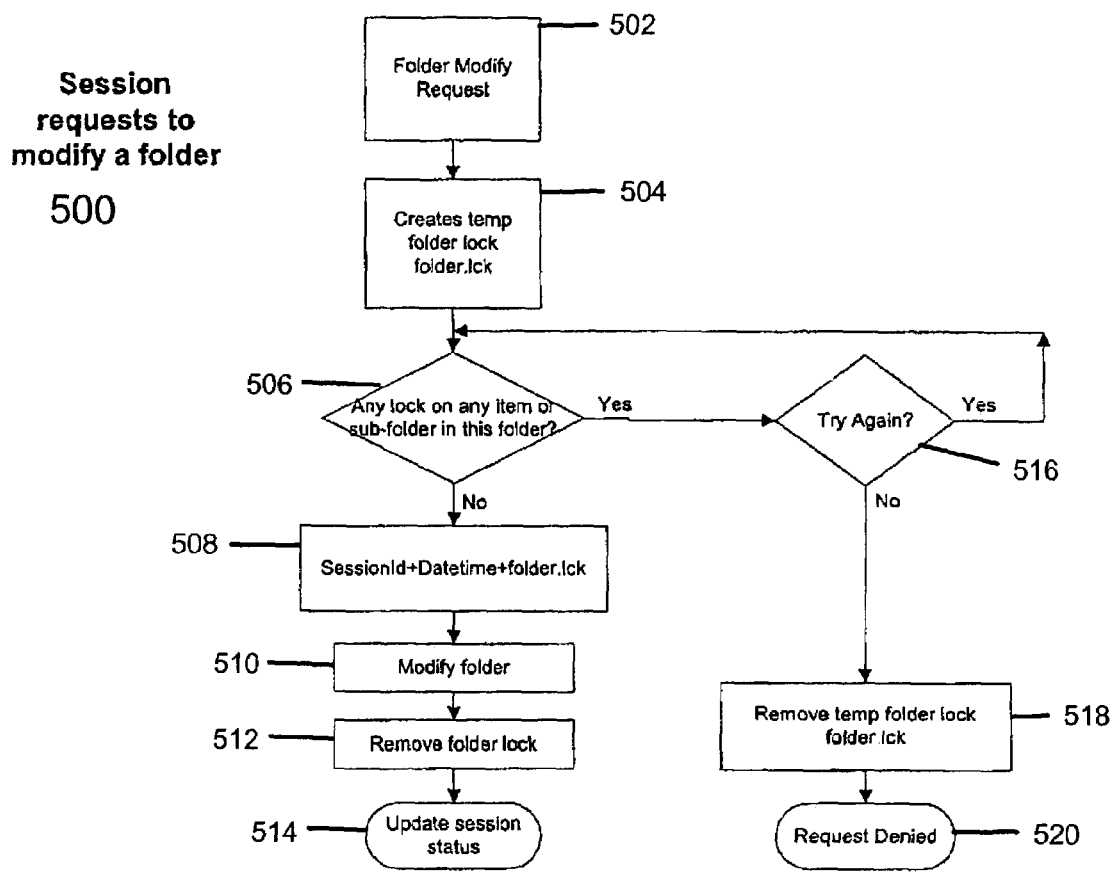
FIG. 5 is a flow chart depicting the steps associated with processing a session request to modify a folder in accordance with the present invention.

Referring now to FIG. 5, there is shown a method 500 used when a session requests to modify a document. The write request is generated at step 502. A temporary lock file 504 is then created. The lock file has the name of the folder, and end with .lck indicating a lock on the folder. An alternative method would be to put a file on the folder itself named folder .lck to indicate the folder is locked. At step 506 it is determined if there is any other lock on the folder. If there is no other lock, then the process proceeds to step 508. At step 508 the temporary file name is updated by pre-appending the session identification and date and time of lock to the file name. The document is then saved at step 510. After the document is saved, at step 512 the lock 106c is removed. Finally, at step 514 the session status is updated.

If at step 506 it is determined there is another lock on the folder, the system then determines whether the lock should be retried as shown in step 516. The retry may be done automatically or the user may be prompted. If retrying, the process returns to step 506, otherwise as shown at step 518 the temporary lock 106c file that was created in step 304 is deleted, and the lock request is denied as shown in step 520.

There are several methods for generating a date-time stamp that are well known in the art. For example the date-time stamp may be in the format of Mmddyyhhmmss where MM is for month of date, dd is for the day of the date, yy is the year of the date, hh equals the hour of the time, mm the minutes of the time, and ss is the number of seconds. As another example is a certain time may be taken as a seed, and the date-time stamp would comprise a numeric variable indicating the number of seconds, or milliseconds from the seed time. These and other well known methods for generating a date-time stamp are compatible with the present invention.

As described hereinabove, the present invention solves many problems associated with previous type methods and implementations. However, it will be appreciated that various changes in the details, materials and arrangements of parts which have been herein described and illustrated in order to explain the nature of the invention may be made by those skilled in the are within the principle and scope of the invention will be expressed in the appended claims.

What is claimed is:

1. A computer-implemented system for managing document access, comprising:
   a web server for storing, editing, and manipulating files and file folders in accordance with at least one session received via an associated network from a browser of at least one of a plurality of associated computers;
   means for generating a common lock file associated with each of a plurality of electronic documents, which electronic documents include at least one of a file and file folder corresponding thereto;
   means for receiving a document access request for access to a selected electronic document from an associated thin client via an associated network;
   means for generating a temporary file lock associated with the selected electronic document;
   testing means for testing the common lock file for a preexisting lock corresponding to the selected electronic document;
   means for releasing the temporary lock file upon a determination of an existence of a preexisting lock on the selected electronic document;
   means for generating a file lock in the common lock file corresponding to the selected electronic document upon a determination of an absence of a preexisting lock on the selected electronic document;
   control means for controlling access to the at least one of the files and file folders in accordance with the common lock file;
   networked storage means associated with the web server for storing the common lock file so as to control sessions of each of the plurality of computers; and
   means for communicating, to at least one associated computer via the associated network, status data representative of whether access to at least one of the files and file folders are allowed in accordance with an output of the testing means,
   wherein the control means includes means for selectively updating content of the lock file to include lock access data for controlling access attributes to at least one file and file folder corresponding thereto stored on the file storage means, the lock access attributes including at least one of a read lock, an authority lock, a write lock, and a folder lock.

2. The computer-implemented system for managing document access of claim 1 wherein the lock file is implemented as a temporary file having a file name with the lock access attributes of the lock file encoded in the file name.

3. The computer-implemented system for managing document access of claim 2 wherein the lock file further comprises a data representative of a date and time the lock file was generated.

4. The computer-implemented system for managing document access of claim 2 wherein the lock access attributes further comprise session identification data representative of a request to access at least one of the files and file folders.

5. The computer-implemented system for managing document access of claim 2 wherein the lock file is generated upon the commencement of a session.

6. The computer-implemented system for managing document access of claim 5 further comprising means for deleting the lock file upon the termination of a session.

7. The computer-implemented system for managing document access of claim 6 further comprising means for receiving a request to terminate access to at least one of the files and file folders.

8. The computer-implemented system for managing document access of claim 7 wherein a session is terminated by at least one of receiving a request to terminate access to at least one of the files and file folders or a predetermined period wherein no requests for further access to at least one of the files and file folders are received.

9. A computer-implemented method for managing web-based document access comprising the steps of:
performing at least one of a storing, editing, and manipulating of files and file folders in a web server in accordance with at least one session received via an associated network from a browser of at least one of a plurality of associated computers;
generating a common lock file associated with each of a plurality of electronic documents, which electronic documents include at least one of a file and file folder corresponding thereto;
receiving a document access request for access to a selected electronic document from an associated thin client via an associated network;
generating a temporary file lock associated with the selected electronic document;
testing the common lock file for a preexisting lock corresponding to the selected electronic document;
releasing the temporary lock file upon a determination of an existence of a preexisting lock on the selected electronic document;
generating a file lock in the common lock file corresponding to the selected electronic document upon a determination of an absence of a preexisting lock on the selected electronic document;
controlling access to the at least one of the files and file folders in accordance with the common lock file;
storing the common lock file in a storage associated with the web server so as to control sessions of each of the plurality of computers; and
communicating, to at least one associated computer via the associated network, status data representative of whether access to at least one of the files and folders are allowed in accordance with an output of the testing of the common lock file, and
updating content of the lock file to include lock access data adapted for controlling access attributes to at least one file and file folder corresponding thereto stored on the file storage means, the lock access attributes including at least one of a read lock, an authority lock, a write lock, and a folder lock.

10. The computer-implemented method for managing web-based document access of claim 9, wherein in the event the at least one file and file folder are locked, periodically querying whether the lock has been removed.

11. The computer-implemented method for managing web-based document access of claim 9, wherein the lock file is implemented as a temporary file having a file name with the lock access attributes of the lock file encoded in the file name.

12. The computer-implemented method for managing web-based document access of claim 9, wherein the lock file further comprises data representative of a date and time the lock file was generated.

13. The computer-implemented method for managing web-based document access of claim 9, wherein the lock access attributes further comprise session identification data representative of a request to access at least one of the files and file folders.

14. The computer-implemented method for managing web-based document access of claim 13, wherein the lock file is generated upon the commencement of a session.

15. The computer-implemented method for managing web-based document access of claim 14, further comprising the step of deleting the lock file upon the termination of a session.

16. The computer-implemented method for managing web-based document access of claim 15 further comprising the step of receiving a request to terminate access to at least one of the files and file folders.

17. The computer-implemented method for managing web-based document access of claim 16, wherein a session is terminated by at least one of receiving a request to terminate access to at least one of the files and file folders or a predetermined period wherein no requests for further access to at least one of the files and the file folders are received.

18. A computer-implemented method for managing web-based document access comprising the steps of:
performing at least one of a storing, editing, and manipulating of files and file folders in a web server in accordance with at least one session received via an associated network from a browser of at least one of a plurality of associated computers;
generating a common lock file associated with each of a plurality of electronic documents, which electronic documents include at least one of a file and file folder corresponding thereto;
receiving a document access request for access to a selected electronic document from an associated thin client via an associated network;
generating a temporary file lock associated with the selected electronic document;
testing the common lock file for a preexisting lock corresponding to the selected electronic document;
releasing the temporary lock file upon a determination of an existence of a preexisting lock on the selected electronic document;
generating a file lock in the common lock file corresponding to the selected electronic document upon a determination of an absence of a preexisting lock on the selected electronic document;
controlling access to the at least one of the files and file folders in accordance with the common lock file;
storing the common lock file in a storage associated with the web server so as to control sessions of each of the plurality of computers; and
communicating, to at least one associated computer via the associated network, status data representative of whether access to at least one of the files and folders are allowed in accordance with an output of the testing of the common lock file, and
updating content of the lock file to include lock access data for controlling access attributes to at least one file and file folder corresponding thereto stored on the file storage means, the lock access attributes including at least one of a read lock, an authority lock, a write lock, and a folder lock.

19. The computer-implemented method for managing web-based document access of claim 18, wherein in the event the at least one file and file folder are locked, periodically querying whether the lock has been removed.

20. The computer-implemented method for managing web-based document access of claim 18, wherein the lock file is implemented as a temporary file having a file name with the lock access attributes of the lock file encoded in the file name.

21. The computer-implemented method for managing web-based document access of claim 18, wherein the lock file further comprises data representative of a date and time the lock file was generated.

22. The computer-implemented method for managing web-based document access of claim 18, wherein the lock access attributes further comprise session identification data representative of a request to access at least one of the files and file folders.

23. The computer-implemented method for managing web-based document access of claim 22, wherein the lock file is generated upon the commencement of a session.

24. The computer-implemented method for managing web-based document access of claim 23, further comprising the step of deleting the lock file upon the termination of a session.

25. The computer-implemented method for managing web-based document access of claim 24 further comprising the step of receiving a request to terminate access to at least one of the files and file folders.

26. The computer-implemented method for managing web-based document access of claim 25, wherein a session is terminated by at least one of receiving a request to terminate access to at least one of the files and file folders or a predetermined period wherein no requests for further access to at least one of the files and the file folders are received.

* * * * *